United States Patent
Chini et al.

(10) Patent No.: US 10,205,539 B2
(45) Date of Patent: Feb. 12, 2019

(54) MAGNETIC CIRCUIT FOR HIGH SPEED AUTOMOTIVE ETHERNET OVER UTP CHANNELS

(71) Applicant: Avago Technologies International Sales Pte. Limited, Singapore (SG)

(72) Inventors: Ahmad Chini, Mission Viejo, CA (US); Mehmet V. Tazebay, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 14 days.

(21) Appl. No.: 15/385,094

(22) Filed: Dec. 20, 2016

(65) Prior Publication Data
US 2017/0187472 A1  Jun. 29, 2017

Related U.S. Application Data (60) Provisional application No. 62/387,156, filed on Dec. 23, 2015.

(51) Int. Cl.
| | |
|---|---|
| *H04B 15/00* | (2006.01) |
| *H04B 3/50* | (2006.01) |
| *H04L 29/08* | (2006.01) |
| *H04L 29/06* | (2006.01) |

(52) U.S. Cl.
CPC ............. *H04B 15/005* (2013.01); *H04B 3/50* (2013.01); *H04L 69/08* (2013.01); *H04L 69/323* (2013.01)

(58) Field of Classification Search
CPC ........ H04B 15/005; H04B 3/50; H04L 69/323
USPC ............................... 375/219; 370/252; 307/2
See application file for complete search history.

(56) References Cited

U.S. PATENT DOCUMENTS

| | | | | |
|---|---|---|---|---|
| 2004/0239465 A1* | 12/2004 | Chen | ....................... | H01F 17/00 336/173 |
| 2008/0136256 A1* | 6/2008 | Gattani | .................. | H04L 12/66 307/2 |
| 2013/0286864 A1* | 10/2013 | Karam | ................ | H04L 41/5067 370/252 |

FOREIGN PATENT DOCUMENTS

WO    WO2005/025064 A2 *  3/2005

\* cited by examiner

*Primary Examiner* — Chieh M Fan
*Assistant Examiner* — Fitwi Hailegiorgis
(74) *Attorney, Agent, or Firm* — Sterne, Kessler, Goldstein & Fox P.L.L.C.

(57) ABSTRACT

The present disclosure is directed to apparatuses for preventing significant amounts of common mode noise from a PHY transceiver, such as an Ethernet PHY transceiver, from coupling to an unshielded twisted-pair cable. The apparatuses can provide common mode noise isolation, while limiting any common mode noise to differential mode noise (CM-DM) conversion. Common mode noise is generally ignored by a PHY transceiver that receives a differential data signal because of differential signaling. However, when common mode noise is converted to differential mode noise, then data errors can result. Thus, limiting any CM-DM conversion is important.

21 Claims, 6 Drawing Sheets

MAGNETIC CIRCUIT FOR HIGH SPEED AUTOMOTIVE ETHERNET OVER UTP CHANNELS

CROSS REFERENCE TO RELATED APPLICATIONS

This application claims the benefit of U.S. Provisional Application No. 62/387,156, filed Dec. 23, 2015, which is incorporated herein by reference in its entirety.

TECHNICAL FIELD

This application relates generally to in-vehicle networks, including Ethernet based in-vehicle networks.

BACKGROUND

The electronics in an automobile (e.g., a car, bus, or truck, to name a few) are typically divided into different domains, such as the power train domain, the chassis domain, the body/comfort domain, the driver assistance domain, and the human-machine interface (HMI) domain. Traditionally, each of these domains contained a set of control units and sensors that operated independently from the control units and sensors of the other domains. Today, there is a lot more interaction between the domains in support of new, advanced features, such as lane-departure warning and collision avoidance. On top of the increased inter-domain interaction, these new, advanced features have further led to an increase in the number of control units and sensors within each domain and the sophistication of these units in terms of the amount of data they process and the speed at which they operate.

The in-vehicle network infrastructure used to support communications within and between these domains has suffered as a result of the increased electronic complexity. The amount of cabling alone used by conventional in-vehicle network infrastructures has caused the car cable assembly to become not only one of the highest cost components in the car (often behind only the engine and chassis), but also one of the heaviest, which negatively effects fuel economy. Also, to support different latency and bandwidth requirements of the various control systems and sensors, the conventional in-vehicle network infrastructure has evolved into a heterogeneous network of various communications networks and protocols, such as the Local Interconnect Network (LIN), FlexRay, Controller Area Network (CAN), Low-Voltage Differential Signaling (LVDS), and the Media Oriented Systems Transport (MOST) protocol. This network heterogeneity complicates communications between domains by requiring gateways to effectuate such exchanges.

Figure 1:
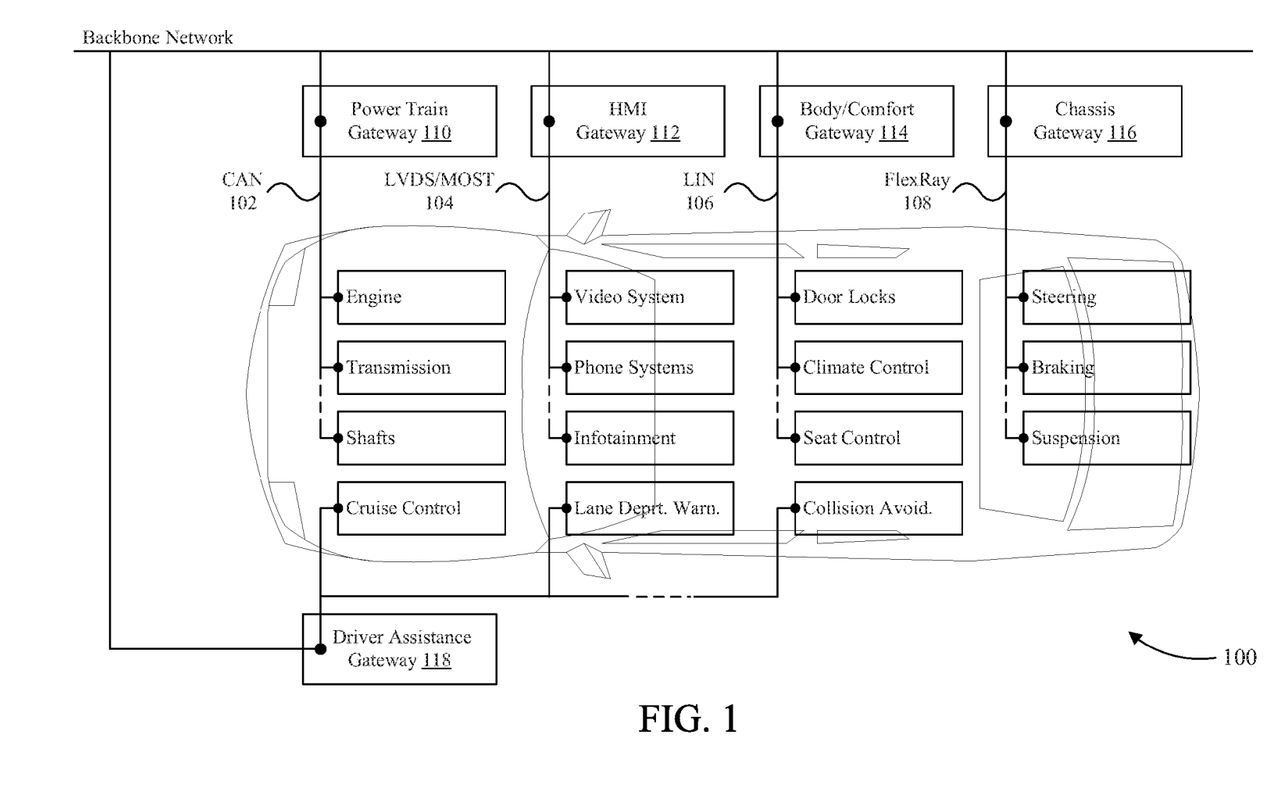
FIG. 1 illustrates an example of a conventional in-vehicle network.

To provide further context, FIG. 1 illustrates an example overview of a conventional in-vehicle network 100. As shown in FIG. 1, conventional in-vehicle network 100 is divided among several different domains, including a power train domain, an HMI domain, a body/comfort domain, a chassis domain, and a driver assistance domain. The power train domain includes electronic controllers and sensors that are active in the forward and backward movement of the vehicle, including electronic controllers and sensors associated with the operation of the engine, transmission, and shafts. The chassis domain includes electronic controllers and sensors that relate to the framework of the automobile and the movement/position of the wheels. For example, the chassis domain can include electronic controllers and sensors that support steering, braking, and suspension. The body/comfort domain includes electronic controllers and sensors for such things as door locks, climate control, and seat control. The HMI domain includes electronics that provide for information exchange between the automobile's electronics and the driver/passengers. For example, the HMI domain includes video systems, phone systems, and infotainment systems. Finally, the driver assistance domain includes electronic controllers and sensors that aid the driver in driving the automobile. The electronic controllers and sensors in the driver assistance domain relate to such systems as cruise control, lane departure warning, and collision avoidance.

As mentioned above, because of the different requirements of each domain, such as latency and bandwidth requirements, the domains often use different communication protocols. For example, as shown in FIG. 1, the power train domain uses a CAN based network 102, the HMI domain uses a LVDS/MOST based network 104, the body/comfort domain uses a LIN based network 106, and the chassis domain uses a FlexRay based network 108. This network heterogeneity requires each domain to have a separate gateway 110-118, as further shown in FIG. 1, to allow for communications between the domains over a backbone network.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Because of the issues with conventional in-vehicle networks discussed above, a new approach to in-vehicle networks that reduces cost, complexity, and/or weight is desired. A homogenous, switched Ethernet based in-vehicle network could be used to this end. But conventional switched Ethernet networks are generally costly for automotive applications and do not meet automotive electromagnetic interference (EMI) requirements while the car is moving. For example, at the data speeds of conventional Ethernet PHYs, such as 100BASE-TX PHYs and 1000BASE-TX PHYs, the signal edges produced by these devices are fast enough to result in too much radiated energy to meet automotive EMI requirements. Shielded cables can be used to reduce EMI, but at increased cost and weight.

Certain embodiments of the present disclosure may be implemented in conjunction with a physical layer device (PHY) of a local Ethernet transceiver in an automobile that converts standard Ethernet media independent interface (MII) data from a 4-bit packet stream, for example, to a 3-bit packet stream. The 3-bit packet stream may be mapped to first and second ternary bit streams for communication to a PHY of a remote Ethernet transceiver in the automobile utilizing PAM-3 (i.e., pulse amplitude modulation with three possible pulse amplitudes) over an unshielded twisted-pair cable. The PHY of the local Ethernet transceiver can multiplex the ternary bits streams into a single stream for transmission over the unshielded twisted-pair cable. In other words, the data flow of the Ethernet line code may begin from a 4-bit MII data stream and then undergo reformation into a 3-bit binary data stream (4b3b) and further converted to two ternary bit (3b2t) streams.

For automotive applications, the above described Ethernet line code can allow the line rate to be slowed down to better meet automotive EMI requirements while using a cheaper and lighter weight unshielded twisted-pair cable. However, even when using reduced line rates, other sources of EMI can occur in an automotive setting when using an unshielded twisted-pair cable to carry differential data signals. In particular, any common mode noise that couples to the unshielded twisted-pair cable can be radiated as emissions that cause EMI with other devices.

The present disclosure is directed to apparatuses for preventing significant amounts of common mode noise from an Ethernet PHY transceiver from coupling to an unshielded twisted-pair cable. The apparatuses can provide common mode noise isolation, while limiting any common mode noise to differential mode noise (CM-DM) conversion. Common mode noise is generally ignored by an Ethernet PHY transceiver that receives a differential data signal because of differential signaling. However, when common mode noise is converted to differential mode noise, then data errors can result. Thus, limiting any CM-DM conversion is important.

2. Exemplary Operating Environment

Figure 2:
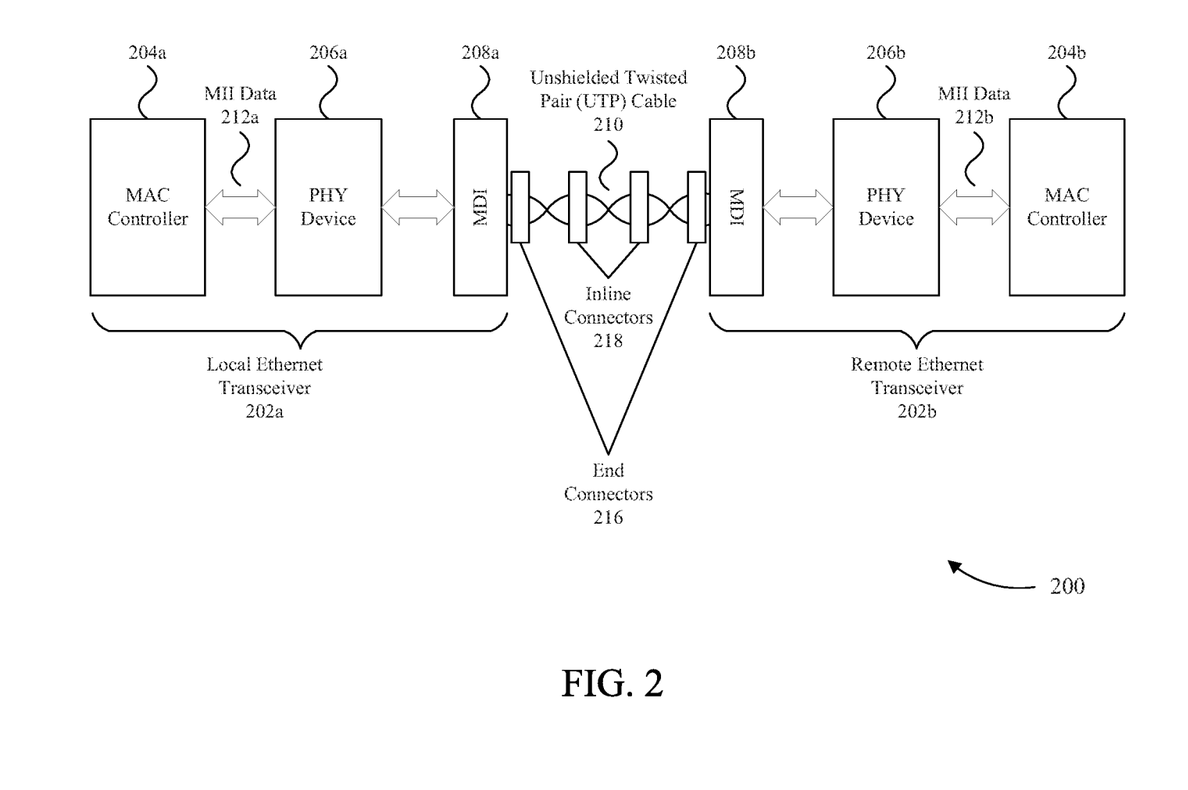
FIG. 2 illustrates an example block diagram of an Ethernet over unshielded twisted-pair (UTP) cabling link between a local Ethernet transceiver and a remote Ethernet transceiver in accordance with embodiments of the present disclosure.

FIG. 2 illustrates an exemplary operating environment in which embodiments of the present disclosure can be implemented. In particular, FIG. 2 illustrates an example block diagram of an Ethernet over unshielded twisted-pair (UTP) cabling link 200 between a local Ethernet transceiver 202a and a remote Ethernet transceiver 202b in accordance with embodiments of the present disclosure. The two transceivers can be implemented within an automobile. The local Ethernet transceiver 202a comprises a medium access control (MAC) controller 204a, a physical layer device (PHY) 206a, and a medium dependent interface (MDI) 208a. The remote Ethernet transceiver 202b similarly comprises a MAC controller 204b, a PHY 206b, and a MDI 208b.

The local Ethernet transceiver 202a and the remote Ethernet transceiver 202b communicate via a UTP cable 210. In one embodiment, the UTP cable 210 comprises a single pair of unshielded copper wires. Certain performance criteria for UTP copper cabling have been standardized. For example, Category 3 cabling may provide the necessary performance for 10 Mbps Ethernet transmissions over twisted-pair cabling (10BASE-T). In another example, Category 5 cabling may provide the necessary performance for 1000 Mbps Ethernet transmissions over twisted-pair cabling (1000BASE-T).

The data transmitted and received by the transceivers 202a and 202b can be formatted in accordance with the well-known Open Systems Interconnection (OSI) model. The OSI model partitions operability and functionality into seven distinct and hierarchical layers. Generally, each layer in the OSI model is structured so that it may provide a service to the immediately higher interfacing layer. For example, layer 1, or the PHY layer, can provide services to layer 2, or the data link layer, and layer 2 can provide services to layer 3, or the network layer. The data transmitted can comprise frames of Ethernet media independent interface (MII) data 212a and 212b, which can be delimited by start-of-stream and end-of-stream delimiters, for example. The data transmitted can also comprise IDLE codes that can be communicated between frames of data.

In the example Ethernet system shown in FIG. 2, the MAC controllers 204a and 204b represent layer 2 devices and the PHYs 206a and 206b represent layer 1 devices. Devices not shown in FIG. 2, but coupled to MAC controllers 204a and 204b, represent one or more of the five highest OSI layers. During transmission, each layer can add its own header to the data passed on from the interfacing layer above it. During reception, a compatible device having a similar OSI stack as the transmitting device can strip off the headers as the message or packet passes from the lower layers up to the higher layers.

The MAC controllers 204a and 204b comprise suitable logic, circuitry, and/or code configured to provide the layer 2 requirements. The MAC controllers 204a and 204b can be configured as standard Ethernet MACs, such as those based on the IEEE 802.3 standard (e.g., the 100BASE-T IEEE 802.3 standard or the 1000BASE-T IEEE 802.3 standard).

The PHYs 206a and 206b comprise suitable logic, circuitry, and/or code configured to provide layer 1 requirements, which include, but are not limited to, packetization, data transfer, and serialization/deserialization. Data packets respectively received by the PHYs 206a and 206b from the MAC controllers 204a and 204b can include data and header information for each of the above six functional layers of the OSI model. The PHYs 206a and 206b can be configured to encode data packets that are to be transmitted over the UTP cable 210 and/or to decode data packets received from the UTP cable 210.

The PHYs 206a and 206b may be configured based on the IEEE 802.3 bw or IEEE 802.3 bp standards, for example. In one embodiment, the PHYs 206a and 206b can be configured to respectively convert Ethernet MII data 212a and 212b, respectively produced by MAC controllers 204a and 204b, from 4-bit packet streams to 3-bit packet streams. The 3-bit packet streams can each be mapped to first and second ternary bits streams for communication to the other PHYs utilizing PAM-3 over the unshielded twisted-pair cable 210. The transmitting PHY can multiplex the ternary bits streams into a single stream for transmission over the unshielded twisted-pair cable 210.

For automotive applications, the above described Ethernet line code can allow the line rate to be slowed down to better meet automotive EMI requirements while using the cheaper and lighter weight UTP cable 210. However, even when using reduced line rates, other sources of EMI can occur in an automotive setting when using the UTP cable 210 to carry differential data signals. In particular, any common mode noise that couples to the UTP cable 210 can be radiated as emissions that cause EMI with other devices.

The following section describes apparatuses for preventing significant amounts of common mode noise from the PHY 206a from coupling to the UTP cable 210 via the MDI 208a. The apparatuses can provide such common mode noise isolation, while limiting any common mode noise to differential mode noise (CM-DM) conversion. Common mode noise is generally ignored by a PHY of an Ethernet transceiver that receives a differential data signal because of differential signaling. Specifically, the information is carried in the difference between the two signal components of a differential signal, and any common mode is ignored by the PHY of an Ethernet transceiver. However, when common mode noise is converted to differential mode noise, then data errors can result. Thus, limiting any CM-DM conversion is important.

It should be noted that FIG. 2 provides only one example environment in which embodiments of the present disclosure can be implemented and is not meant to be limiting. The Ethernet system shown in FIG. 2 can be used, for example, to support communications within and between the different electronic domains in an automobile as shown in FIG. 1.

3. Common Mode Noise Isolation

Figure 3:
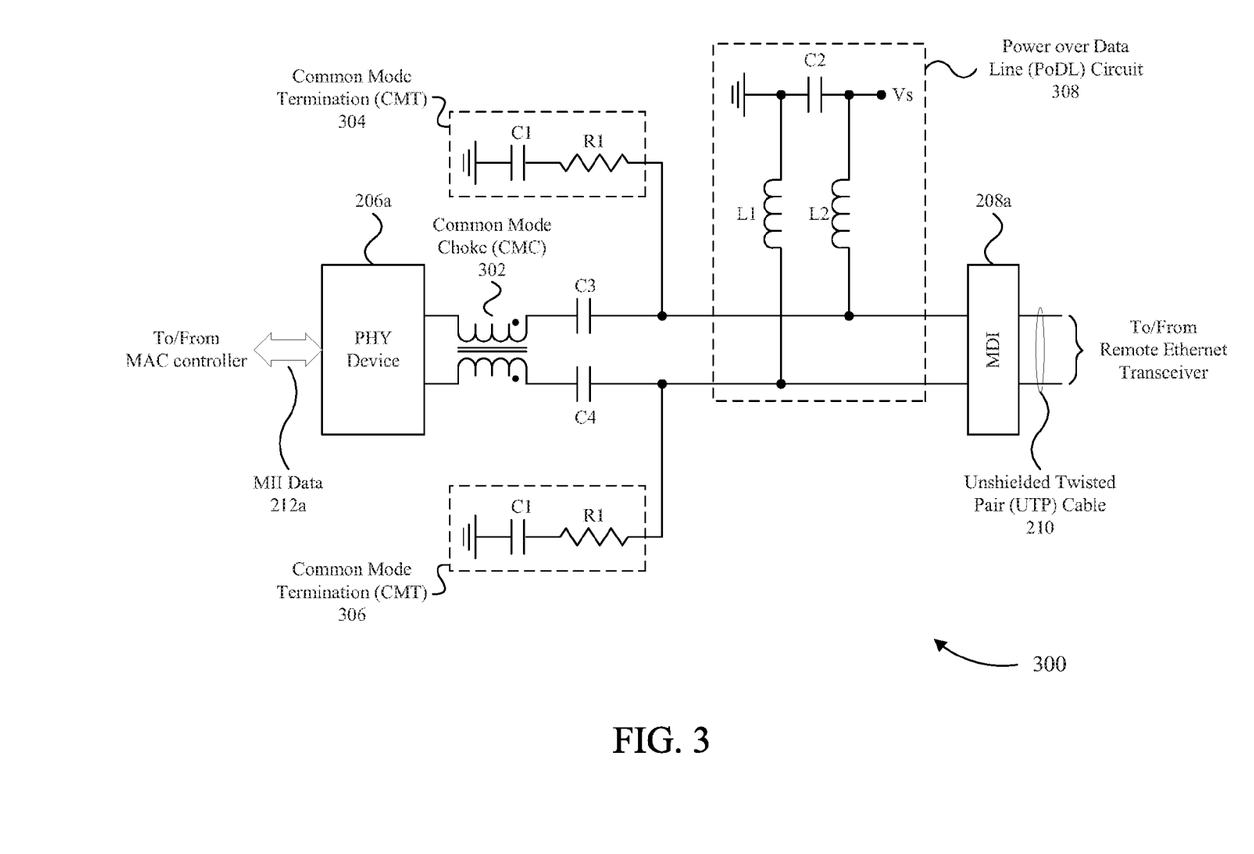
FIG. 3 illustrates a circuit to provide common mode noise isolation between a PHY and an MDI using a common mode choke (CMC) and common mode terminations (CMTs) in accordance with embodiments of the present disclosure.

FIG. 3 illustrates a circuit 300 to provide common mode noise isolation between the PHY 206a and the MDI 208a using a common mode choke (CMC) 302 and common mode terminations (CMTs) 304 and 306. The CMC 302 operates to attenuate common mode signals and pass differential signals (e.g. differential Ethernet data signals) so as to limit common mode noise entering the PHY 206a from the MDI 208a and common mode noise entering the MDI 208a from the PHY 206a. The CMC 302 can include a transformer with a metallic core wrapped by a primary winding and a secondary winding, with winding polarities as indicated by the conventional, transformer dot notation in FIG. 3. Based on the indicated transformer winding polarities, the windings of the CMC 302 are wrapped in the same direction around its core.

Differential mode currents carrying data will flow in opposite directions through the windings of the CMC 302, which will result in equal and opposite magnetic fields in the windings that cancel each other out. Because the magnetic fields cancel each other out, the CMC 302 presents zero impedance to differential mode currents carrying data and passes the differential mode currents without attenuation. Common mode currents, on the other hand, will flow in the same direction through the windings of the CMC 302, which will result in equal and in-phase magnetic fields that add together. Because the magnetic fields in the windings add together, the CMC 302 presents a high impedance to common mode currents and thereby attenuates the common mode currents. Direct current (DC) blocking capacitors C3 and C4 are included at the output of the CMC 302.

The CMTs 304 and 306 provide a termination for common mode noise using capacitors C1 and resistors R1 to control common mode noise resonance of the UTP cable 210. In one embodiment, the resistor R1 can be set equal to half the value of the differential-mode impedance of the UTP cable 210.

As further shown in FIG. 3, the circuit 300 includes an optional Power over Data Line (PoDL) circuit 308. The PoDL circuit 308 provides DC voltage Vs to the UTP cable 210 so that DC power can be carried over the UTP cable 210 simultaneously with the differential data. The PoDL circuit 308 includes a DC blocking capacitor C2 and inductors L1 and L2. The inductors L1 and L2 provide a DC path for the DC voltage Vs to the UTP cable 210, but present a high impedance path to the high frequency differential data signal on the UTP cable 210 so as to prevent attenuation of the differential data signal. PoDL is currently being standardized under IEEE 802.3 bu Task Force.

Although the circuit 300 can provide common mode isolation, the circuit 300 can suffer from high-levels of common mode noise to differential mode noise (CM-DM) conversion. CM-DM conversion directly affects the signal-to-noise ratio of the differential data signal on the UTP cable 210 and, thus, deteriorates link performance. In addition, high CM-DM conversion can also lead to emissions radiated from the UTP cable 210 that can cause interference with other devices. There are two primary sources of CM-DM conversion in the circuit 300.

The first source of CM-DM conversion in the circuit 300 is the resistors R1 in the CMTs 304 and 306. When the resistors R1 in the CMTs 304 and 306 terminate high amounts of common mode noise, the resistors R1 generate excessive amounts of heat, which causes an imbalance between the two resistors R1 in the CMTs 304 and 306. This imbalance subsequently leads to CM-DM conversion.

The second source of CM-DM conversion in the circuit 300 is an imbalance between inductors L1 and L2. Ideally, inductors L1 and L2 have equal inductance. However, it is typically hard to construct inductors L1 and L2 with equal inductance in many implementations of the circuit 300. The imbalance between inductors L1 and L2 in terms of their respective inductances leads to CM-DM conversion.

Figure 4A:
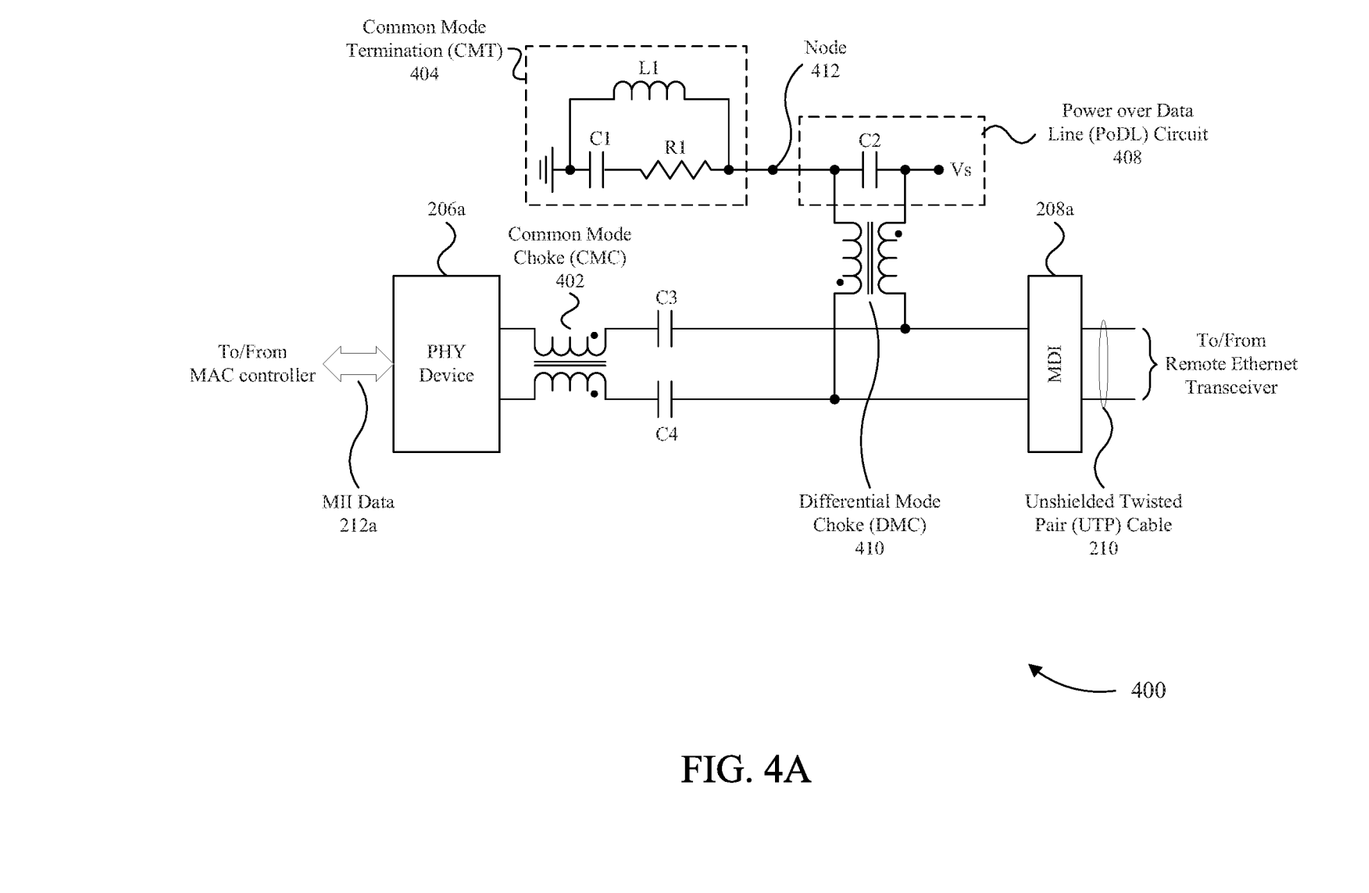
FIG. 4A illustrates a circuit that combines a CMC and a differential mode choke (DMC) with a single CMT to provide common mode noise isolation between a PHY and an MDI in accordance with embodiments of the present disclosure.

FIG. 4A illustrates a circuit 400 that combines a CMC 402 and differential mode choke (DMC) 410 with a single CMT 404 to provide a more practical and reliable design for common mode isolation as well as support for PoDL 408. As with CMC 302 in FIG. 3, the CMC 402 is configured to provide a high impedance for common mode noise while providing a low impedance for differential signals, so as to prevent common mode noise from entering the PHY 206a from the MDI 208a and vice versa. Accordingly, the CMC 402 includes a transformer with a magnetic core wrapped by primary and secondary windings having polarities as indicated by the transformer dot notation to provide common mode noise attenuation, similar to the CMC 302 in FIG. 3.

The PoDL 408 does not include the inductors L1 and L2 like the PoDL 308 in FIG. 3 but instead utilizes the DMC 410 to provide similar functionality as the inductors L1 and L2. In particular, like the inductors L1 and L2 from FIG. 3, the DMC 410 provides a DC path for the DC voltage Vs of the PoDL 408 to the UTP cable 210, while presenting a high impedance path to the high frequency differential data signal on the UTP cable 210. The high impedance path presented by the DMC 410 to the high frequency differential data signal on the UTP cable 210 prevents attenuation of the differential data signal. The DMC 410 further provides an additional functionality not provided for by the inductors L1 and L2 in FIG. 3: a low impedance for common mode noise.

To provide the above noted functionalities, the DMC 410 includes a transformer with a metallic core wrapped by a primary winding and a secondary winding, with winding polarities as indicated by the conventional, transformer dot notation in FIG. 4A. Based on the indicated transformer winding polarities, the windings of the DMC 410 are wrapped in opposite directions around its core so that the first and second windings are inversely coupled, which is in contrast to the windings of the CMC 402 that are wrapped in the same direction around the core of the CMC 402.

Differential mode currents carrying data will flow in the same direction through the windings of the DMC 410, which will result in equal and in-phase magnetic fields in the windings that add together. Because the magnetic fields add together, the CMC 302 presents a high impedance to differential mode currents carrying data and thereby attenuates the differential mode currents. Common mode currents, on the other hand, will flow in opposite direction through the windings of the DMC 410, which will result in equal and opposite magnetic fields in the windings that cancel each other out. Because the magnetic fields cancel each other out, the DMC 410 presents zero impedance to common mode currents and passes the common mode currents. In one embodiment, the windings or inductors of the DMC 410 are approximately 2 uH each to allow for good insertion loss and return loss for 1000BASE-T1applications.

The two windings or inductors of the DMC 410 are connected with a capacitor C2 (about 100 nF) which provides DC power supply filtering of voltage Vs and presents a low impedance at data signal frequencies. The low impedance of capacitor C2 at data signal frequencies provides a common mode reference at node 412. The CMT 404 is connected at node 412 to absorb or dissipate any common mode noise power that is passed by the DMC 410. The CMT 404 is configured to provide a short to ground for DC current using inductor L1, and the impedance of the CMT 404 is matched (approximately) to the UTP cable 210 impedance in the data signal bandwidth using R1. Common mode noise resonances are significantly reduced with the CMT 404. Further, since there is a single point of common mode termination at node 412, the imbalance issue from heat dissipation is eliminated when compared to the circuit of FIG. 3 as discussed above, thereby reducing CM-DM conversion.

It should be noted that because the windings or inductors of the DMC 410 are coupled they can be more readily balanced than the isolated inductors L1 and L2 in FIG. 3. This further reduces CM-DM conversion. It should also be noted that DC blocking capacitors C3 and C4 are also included at the output of the CMC 402.

Figure 4B:
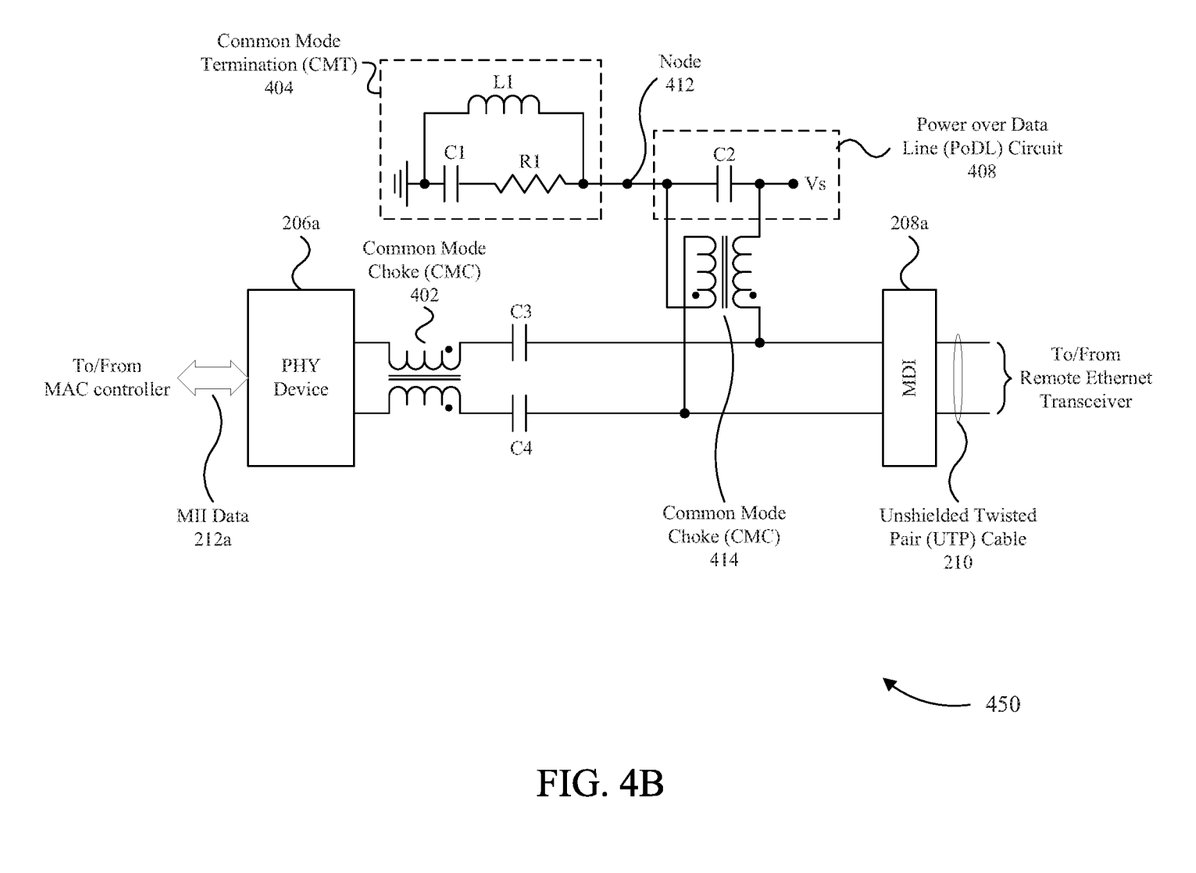
FIG. 4B illustrates a circuit that combines two CMCs with a single CMT to provide common mode noise isolation between a PHY and an MDI in accordance with embodiments of the present disclosure.

FIG. 4B illustrates an alternative circuit 450 using a CMC 414 in place of the DMC 410 in FIG. 4A. The inputs of the left winding of the CMC 414 are swapped relative to the inputs of the left winding of the DMC 410 in FIG. 4A to provide similar functionality as the DMC 410 as would be appreciated by one of ordinary skill in the art based on the teachings herein. The inductor coupling effect for the DMC 410 and the CMC 414 is the same. However, the CMC 414 may be designed to a different specification than the DMC 410 and this may affect some details of magnetic building.

Figure 5:
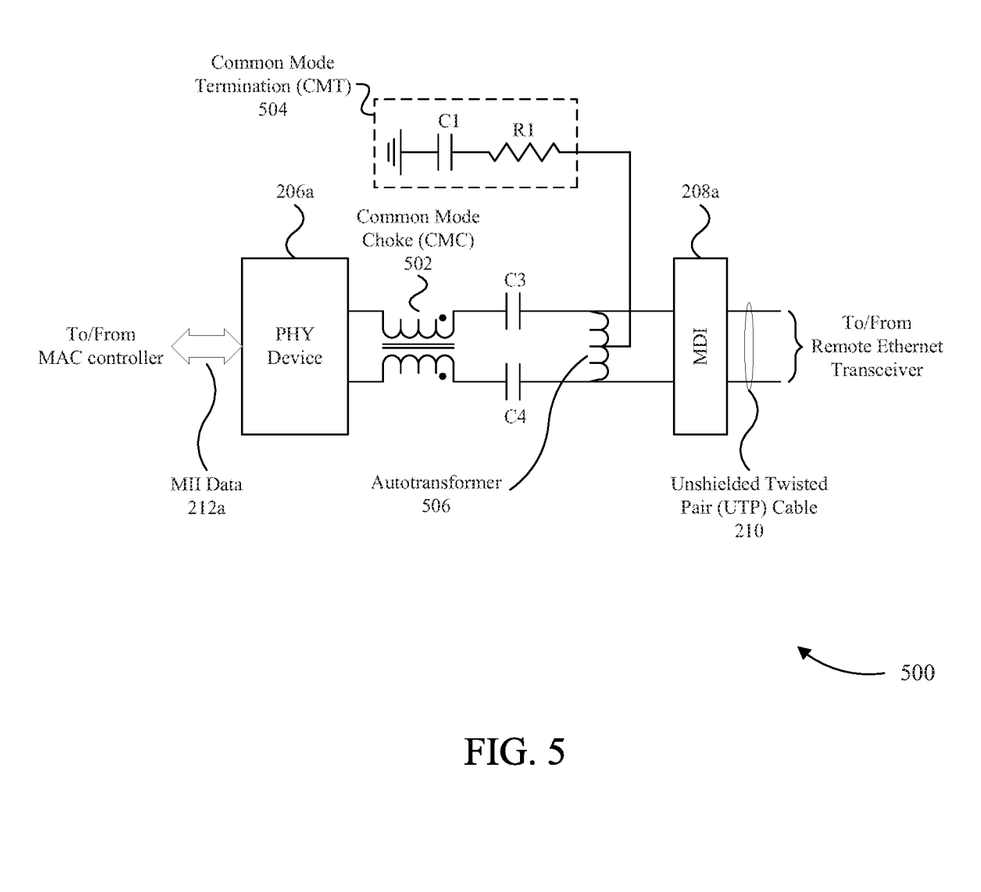
FIG. 5 illustrates a circuit that combines a CMC and an autotransformer with a single CMT to provide common mode noise isolation between a PHY and an MDI in accordance with embodiments of the present disclosure.

It is noted that the circuits of FIG. 4A and FIG. 4B provide reduced CM-DM conversion and better common mode rejection as compared to the circuit of FIG. 3. In addition, it should be noted that the circuits of FIGS. 4A and 4B can be used regardless of PoDL presence. An alternative circuit 500, when there is no need for PoDL, is shown in FIG. 5. An Autotransformer 506 is used with a center tap connected to a single CMT circuit 504. The autotransformer is configured to provide a low impedance to the common mode noise and a high impedance for the differential data signal. The CMC 502 serves the same function as CMC 402 described above in regard to FIG. 4A and FIG. 4B.

It is further noted that there are multiple ways to wind wires on a magnetic core for coupled inductors, like those found in a CMC or DMC discussed above. The two inductors can be wound together or over each other. Alternatively, the two inductors can sit over different parts of the same core. The latter one may have less parasitic capacitance between the two inductors, thus providing wider bandwidth. Further, alternative designs for circuits of FIG. 4A and FIG. 4B can use separate grounds for power supply and common mode termination (i.e., C1 and L1 connected to different grounds). This provides isolation of grounding on the line side and the PHY side.

4. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A transceiver, comprising:
a physical layer device (PHY) configured to send and receive differential data signals via a media dependent interface (MDI) over an unshielded twisted pair (UTP) cable;
a common mode choke (CMC), coupled between an input/output port of the PHY and the MDI, and configured to provide a low impedance to the differential data signals and a high impedance to common mode noise;
a common mode termination (CMT) configured to provide a matched termination for the common mode noise; and
a differential mode choke (DMC), coupled between the UTP cable and the CMT, configured to provide a low impedance for the common mode noise and a high impedance for the differential data signals,
wherein the CMT includes an input node connected to an output of the DMC and includes another node connected to ground.

2. The transceiver of claim 1, wherein the DMC comprises a core, a first winding, and a second winding, wherein the first winding and the second winding are wound in opposite directions around the core so that the first and second windings are inversely coupled.

3. The transceiver of claim 2, further comprising:
a voltage supply connected to a first end of the first winding, wherein a second end of the first winding is connected to a first wire of the UTP cable.

4. The transceiver of claim 3, wherein a first end of the second winding is connected to ground through the CMT, and wherein a second end of the second winding is connected to a second wire of the UTP cable.

5. The transceiver of claim 4, further comprising:
a capacitor connected between the first end of the first winding and the first end of the second winding to provide a common mode reference at an input of the CMT.

6. The transceiver of claim 1, further comprising:
a direct current (DC) blocking capacitor coupled between an output port of the CMC and the UTP cable.

7. The transceiver of claim 1, wherein the differential data signals are Ethernet differential data signals.

8. The transceiver of claim 1, wherein the transceiver is implemented in an automobile.

9. A transceiver, comprising:
a physical layer device (PHY) configured to send and receive differential data signals via a media dependent interface (MDI) over an unshielded twisted pair (UTP) cable;
a first common mode choke (CMC), coupled between an input/output port of the PHY and the MDI, and configured to provide a low impedance to the differential data signals and a high impedance to common mode noise;
a common mode termination (CMT) configured to provide a matched termination for the common mode noise; and
a second CMC, coupled between the UTP cable and the CMT, configured to provide a low impedance for the common mode noise and a high impedance for the differential data signals,
wherein the CMT includes an input node connected to an output of the second CMC and includes another node connected to ground.

10. The transceiver of claim 9, wherein the second CMC comprises a core, a first winding, and a second winding, wherein the first winding and the second winding are wound in the same direction around the core.

11. The transceiver of claim 10, further comprising:
a voltage supply connected to a first end of the first winding, wherein a second end of the first winding is connected to a first wire of the UTP cable.

12. The transceiver of claim 11, wherein a first end of the second winding is connected to ground through the CMT, and wherein a second end of the second winding is connected to a second wire of the UTP cable.

13. The transceiver of claim 12, further comprising:
a capacitor connected between the first end of the first winding and the first end of the second winding to provide a common mode reference at an input of the CMT.

14. The transceiver of claim 9, further comprising:
a direct current (DC) blocking capacitor coupled between an output port of the first CMC and the UTP cable.

15. The transceiver of claim 9, wherein the differential data signals are Ethernet differential data signals.

16. The transceiver of claim 9, wherein the transceiver is implemented in an automobile.

17. A transceiver, comprising:
a physical layer device (PHY) configured to send and receive differential data signals via a media dependent interface (MDI) over an unshielded twisted pair (UTP) cable;
a common mode choke (CMC), coupled between an input/output port of the PHY and the MDI, and configured to provide a low impedance to the differential data signals and a high impedance to common mode noise;
a common mode termination (CMT) configured to provide a matched termination for the common mode noise; and
an autotransformer, coupled between the UTP cable and the CMT, configured to provide a low impedance to the common mode noise and a high impedance for the differential data signals,
wherein the CMT includes an input node connected to a center tap of the autotransformer and includes another node connected to ground.

18. The transceiver of claim 17, further comprising:
a direct current (DC) blocking capacitor coupled between an output port of the CMC and the UTP cable.

19. The transceiver of claim 17, wherein the differential data signals are Ethernet differential data signals.

20. The transceiver of claim 17, wherein the transceiver is implemented in an automobile.

21. The transceiver of claim 17, wherein the autotransformer includes a single winding having the center tap, wherein a first end of the single winding is connected to a first wire of the UTP cable, and a second end of the single winding is connected to a second wire of the UTP cable.

* * * * *